April 18, 1939.    B. S. CAIN    2,155,218

BEARING LUBRICATING SYSTEM

Filed May 21, 1938

Inventor:
Basil S. Cain,
by Harry E. Dunham
His Attorney.

Patented Apr. 18, 1939

2,155,218

UNITED STATES PATENT OFFICE 2,155,218

BEARING LUBRICATING SYSTEM

Basil S. Cain, Erie, Pa., assignor to General Electric Company, a corporation of New York Application May 21, 1938, Serial No. 209,291

6 Claims. (Cl. 184—6)

This invention relates to bearing lubricating systems and while not necessarily limited thereto, it is particularly adaptable for dynamo electric machines.

In certain instances it is desirable to lubricate the bearings of dynamo electric machines by a forced feed system and in power plant installations a common pump is usually provided for supplying lubricating oil under pressure to the bearings of the various machines of the plant. After circulating through the various bearings, the oil is drained into sump chambers beneath the bearings and flows therefrom, usually by gravity, back to the supply reservoir. In such lubricating systems a drain conduit may become clogged by foreign matter so as to impair the oil flow therethrough or there may be insufficient gravity head for drainage which results in the flooding of the bearings and oil, due to the superimposed pressure, is forced past the normal packing arrangements, and is thrown from the shaft onto the internal parts of the machine structure. In some machines such accidental flooding of the bearings may not prove injurious but in the case of dynamo electric machines it may give rise to much consequential damage. Oil leaking into the heated interior of the working machine may become vaporized, which vapors are likely to be ignited by the sparking occurring between the commutator and brushes. In addition to this fire hazard, the leaking oil may cause considerable damage to the internal insulation of the machine and gumming of the commutator surface and the brush holders.

It is an object of my invention to provide a new and improved lubricating system for bearings in which the danger of flooding is minimized and the continuity of oil circulation therethrough assured in a simple and effective manner.

For a consideration of what I believe to be novel and my invention, attention is directed to the following description and the claims appended thereto taken in connection with the accompanying drawing.

Figure 1:
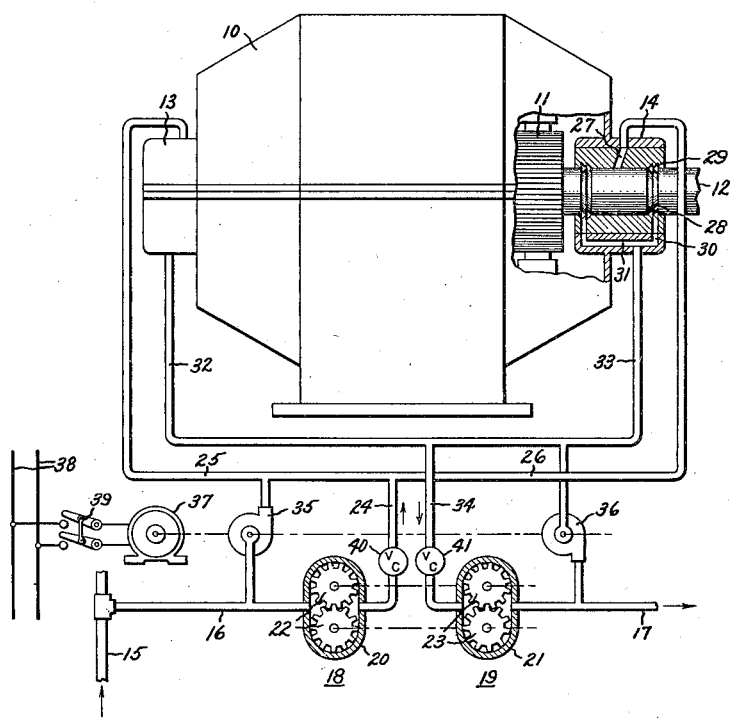
Figure 2:
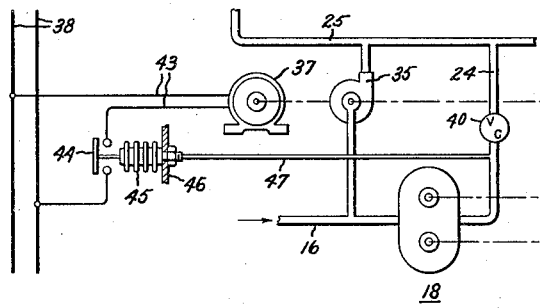

In the drawing, Fig. 1 illustrates a dynamo electric machine, partly in section, embodying a bearing lubricating system according to my invention, and Fig. 2 is a modification disclosing a control system for certain auxiliary apparatus of my invention.

Referring to Fig. 1 of the drawing, 10 is a dynamo electric machine having a rotor 11 and a shaft 12 mounted within bearings 13 and 14 in the opposite ends of the machine. Oil under pressure from a source of supply 15 of the power plant lubricating system is adapted to be supplied to the bearings through a supply conduit 16. After passing through the bearings of the machine, the oil is returned to the reservoir of the system (not shown) by means of the drain conduit 17.

In accordance with my invention, to preclude the flooding of the bearings I provide a hydraulic motor 18 and a pump 19 in the supply and drain conduits 16 and 17, respectively. Although any suitable motor and pump combination may be used, I have shown the devices as being similar in construction and comprising separate casings 20 and 21 having pairs of gears 22 and 23 provided in each casing respectively. The corresponding gears of the two devices are preferably mounted upon common shafts, as indicated, so that the gears of the pump 19 will be driven at the same speed as the gears of the motor 18 are driven by the oil forced therethrough. The lubricating oil discharging from the motor 18 passes into the feeder conduit 24 and is supplied through branch feeders 25 and 26 to the upper portions of the bearings 13 and 14 respectively, a suitable passage 27 being provided in each bearing structure for properly distributing the lubricating oil to the bearing surfaces. After the oil has circulated across the bearing surfaces, it is thrown by slingers 28 provided at opposite ends of the shaft bearing surface into annular passages 29 provided in the stationary bearing part which drain through passages 30 into a sump chamber 31 provided in the lower part of the bearing housing. Lubricating oil is withdrawn from the sump chambers by branch drain conduits 32 and 33 respectively which in turn feed into the common drain line 34 and into the pump 19.

By this arrangement the motor 18 is driven by the oil forced through the supply conduit 16 and at a speed proportional to the rate of flow therethrough and since the pump 19 is driven directly by the motor 18, the rate of discharge of the pump is at all times substantially equal to the rate at which oil is supplied to the bearings. It is preferred to embody a pump having a capacity slightly greater than the motor 18 so as to insure substantially complete drainage of the sump chambers 31. With the sump chambers 31 maintained empty, proper drainage of the annular spaces 29 and the drain passages 30 in the bearing structure is facilitated permitting the proper functioning of the slingers 28 on the rotor shaft. Accordingly, the probabilities of flooding of the bearings and leakage of oil resulting in injuries to the interior of the machine are greatly reduced. Due to the continual suction on the branch drain conduits 32 and 33 and the positive pressure impressed upon the oil in the drain line 17, the danger of clogging of the passage is effectively minimized. Also pump 19 may deliver the oil to a level higher than sump 31, if desired.

Auxiliary oil circulating means are provided as a safety measure in the event of failure of the power plant lubricating system resulting in a decrease of oil pressure in the supply line to a value insufficient to provide proper lubrication for the dynamo electric machine. As shown in the drawing, I provide suitable pumps 35 and 36 arranged in the supply and drain conduits parallel with the motor 18 and the pump 19 respectively. The pumps 35 and 36 may be driven from a common shaft by a suitable motor 37. This motor is shown as an electric motor connected to a suitable source of supply 38 through a switch 39 and is adapted to be energized for driving the pumps upon the failure of the power plant lubricating oil pressure pump. When the pumps 35 and 36 are in operation, reversal of flow through the motor 18 and the pump 19 may be prevented by check valves 40 and 41 provided in the conduits 24 and 34 respectively.

Although the motor 37 may be controlled by the manual operation of the switch 39, it may be automatically controlled in response to a condition of pressure at the discharge of the motor 18. As shown in Fig. 2, the energizing circuit 43 for the motor 37 is adapted for control by a contactor 44 which is operable by a pressure responsive bellows device 45 mounted upon a stationary support 46 and connected by a conduit 47 to the conduit 24 at the exhaust of the motor device 18. It is understood, of course, that any suitable type of pressure responsive switch may be used. By this arrangement, should the pressure in the supply conduit 16 and hence also in the conduit 24 fall below a predetermined minimum value required for the proper lubrication of the bearings 13 and 14 the bellows 45 will collapse, thereby completing the circuit 43 and effecting the energization of the motor 37 and the operation of the auxiliary pumps 35 and 36. Further, should a bit of waste or other particle of foreign matter get into the motor 18 and stop the operation thereof, the flow of fluid in the discharge conduit 24 will accordingly be arrested with a resultant drop in pressure therein. Thus even though normal pressure be maintained in the supply conduit 16, should the pressure drop to an abnormally low value in the conduit 24, the energization of the motor 37 will be effected to continue the circulation of lubricating oil through the bearings.

Having described the method of operation of my invention together with the apparatus which I now consider to represent the best embodiment thereof, I desire to have it understood that the apparatus shown is only illustrative and that the invention may be carried out by other means.

What I claim as new and desire to secure by Letters Patent of the United States is:

1. In a bearing lubricating system, a source of lubricating oil under pressure, conduit means for supplying oil from said source to said bearings, conduit means for draining oil from said bearings, a gear motor in said supply conduit adapted to be driven by the flow of oil therethrough, a gear pump driven by said gear motor arranged in said drain conduit for discharging oil therefrom, an auxiliary pump arranged in parallel with said gear motor, an auxiliary pump arranged in parallel with said gear pump, an auxiliary motor for driving said auxiliary pumps, means for energizing said auxiliary motor upon a predetermined drop in pressure at the discharge of said gear motor.

2. In a bearing lubricating system, conduit means for supplying lubricating oil under pressure to said bearings, conduit means for draining oil from said bearings, motor means in said supply conduit driven by the oil flowing therethrough, pump means driven by said motor means arranged in said drain conduit for withdrawing oil from said bearings, an auxiliary pump arranged in parallel relationship with said motor means, a second auxiliary pump arranged in parallel with said first mentioned pump means in said drain conduit, an auxiliary motor for driving said two auxiliary pumps, means for energizing said auxiliary motor in response to a predetermined minimum pressure obtaining at the discharge of said first mentioned motor means, and means for precluding reversal of oil flow through said motor means and said pump means upon the operation of said auxiliary pump.

3. In combination, a dynamo electric machine having a rotor including a commutator, bearings for rotatably supporting said rotor in said machine, a source of lubricating oil under pressure, conduit means for supplying lubricating oil from said source to said bearings, conduit means for draining oil from said bearings, means for precluding leakage of oil from said bearings to said rotor commutator including a motor arranged in said supply conduit adapted to be driven by the oil flowing therethrough and a pump driven by said motor arranged in said drain conduit for withdrawing oil from said bearings at a rate at least as great as the rate at which oil is supplied thereto.

4. In a bearing lubricating system, a stationary bearing, a shaft rotatably supported in said bearing, a source of lubricating oil under pressure, a supply conduit for conducting lubricating oil from said source to said bearing, passages in said stationary bearing part for distributing lubricating oil to the bearing surfaces, oil slingers on said shaft adjacent the ends of the bearing surface thereof, drain passages in said stationary bearing part surrounding said slingers, a sump chamber in the lower portion of said stationary bearing part communicating with said drain passages, a drain conduit for conducting oil from said sump chamber, means for precluding flooding of said sump chamber and drain passages including a motor arranged in said supply conduit adapted to be driven by the oil flowing therethrough and a pump driven by said motor arranged in said drain conduit.

5. In combination, a dynamo electric machine, bearings for rotatably supporting the rotor thereof, a source of lubricating oil under pressure, conduit means for supplying lubricating oil from said source to said bearings, conduit means for draining oil from said bearings, means for precluding the flooding of said bearings including a motor arranged in said supply conduit and adapted to be driven by the oil flowing therethrough and a pump driven by said motor arranged in said drain conduit for discharging oil therefrom.

6. In a bearing lubricating system, conduit means for supplying lubricating oil under pressure to said bearings, conduit means for draining oil from said bearings, motor means adapted to be driven by the oil flow through said supply conduit, pump means driven by said motor means arranged in said drain conduit for withdrawing oil from said bearings.

BASIL S. CAIN.